United States Patent Office 3,297,484
Patented Jan. 10, 1967

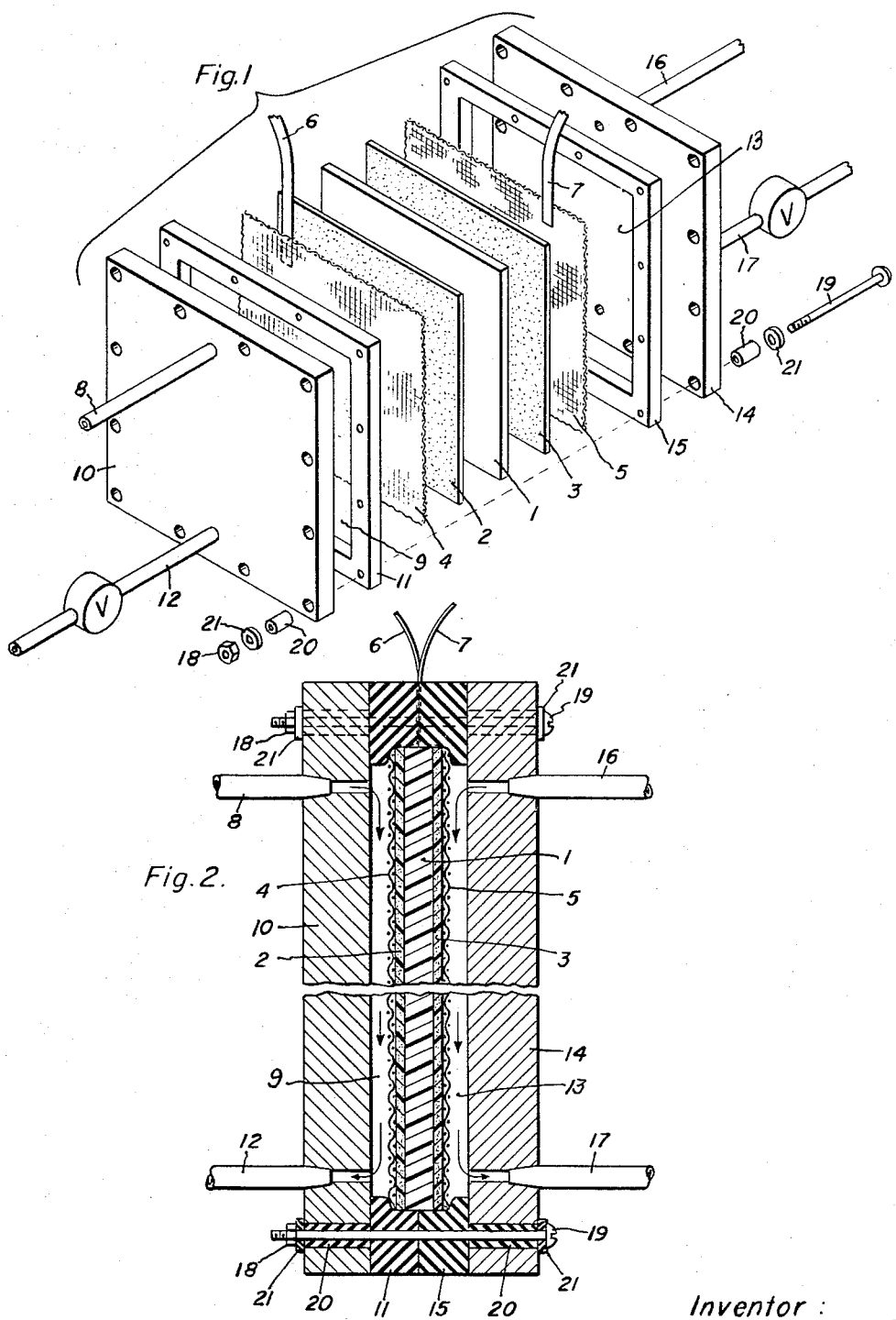

3,297,484
ELECTRODE STRUCTURE AND FUEL CELL INCORPORATING THE SAME
Leonard W. Niedrach, Schenectady, N.Y., assignor to General Electric Company, a corporation of New York
Filed May 8, 1961, Ser. No. 108,418
22 Claims. (Cl. 136—86)

This invention relates to gaseous fuel cells. More particularly, this invention relates to improved gaseous fuel cells comprising a pair of gas adsorbing, gas permeable, hydrophobic, electronically conductive electrode elements in contact with a solid matrix having sorbed therein an aqueous electrolyte and to the improve electrode structures used in such cells. These electrode structures used in combination with the solid matrix containing the sorbed aqueous electrolyte produce gaseous fuel cells which are ideally suited for cyclic operation wherein the cells generate electricity during the discharge period in which the fuel and oxidant gases are consumed and consume electricity during the charge period in which the fuel and oxidant gases are regenerated. A cell operated in this fashion is thus an electrical storage device. The complete discharge and charge cycle to which these devices are subjected places severe requirements on the electrode and electrolyte structure of the cells with regard to stability and non-polarization during operation.

The new electrode structures comprise catalytically active, gas adsorbing particles bonded together with polytetrafluoroethylene to produce electronically conductive, gas-permeable, hydrophobic electrode structures which can be produced in relatively thin films which is desirable for increasing the efficiency of the cell, as well as lowering the actual cost. Because the new cell retains aqueous electrolyte within a matrix so that it can be made to contain no free-flowing fluids, the cells have the added advantage of being ideally suited for applications in a gravity-free environment.

Many of the presently known fuel cells suffer from the fact that they have relatively low volume efficiency, that is, the amount of electrical power which can be obtained from a unit volume of cell is relatively low. In addition, the use of free-flowing, and at times circulating, aqueous electrolytes in many of these cells precludes their operation in a gravity-free environment without resorting to exceedingly complex auxiliary controls.

In my copending application, Serial No. 850,589, filed November 3, 1959, now U.S. Patent 3,134,697 which is assigned to the same assignee as the present invention, there is disclosed and claimed a related novel fuel cell comprising an ion exchange resin membrane as an electrolyte having integrally bonded electrodes on the two major surfaces of the membrane which is ideally suited for operation as a fuel cell having high volume efficiency. In such a fuel cell high volume efficiency is obtained by having the electrodes in direct contact with the gases with a minimum interference of the by-product water which is drained from the cell, when the cell is operated continuously as a source of electric current. This fuel cell is ideally suited for operation on continuous discharge since the electrolyte consists of the ionically active groups on the membrane itself and these groups cannot be leached from the membrane by the water produced by the cell reacton.

The maximum power capability of this cell can be increased by equilibrating the ion-exchange resin membrane with an electrolyte such as a sulfuric acid solution to increase the conductivity of the membrane and to improve the performance of the electrodes of the cell. Such an expedient does work and the fuel cell operates with reduced polarization. Polarization is that effect which is readily noted by the decrease in voltage as the amount of current supplied by the cell increases. This is a normal characteristic of all fuel cells and can never be entirely eliminated. However, any reduction of the polarization of a fuel cell is a much sought-after and desired accomplishment, since it permits a given cell to provide a greater amount of current at a given voltage, thereby increasing the maximum power capability and efficiency of the cell.

Unfortunately, the improvement in performance is only temporary, since the reaction of the fuel and oxidant gas produces water which dilutes and extracts the unbound electrolyte as it drains from the fuel cell, until finally, under continued operation, the fuel cell is operating the same as it would have if the ion exchange membrane had not been equilibrated with the electrolyte.

Such complete dilution does not occur in cells operating on regenerative cycles. Under these conditions the water formed and expelled from the membrane during the discharge of the cell is returned to the membrane and electrolyzed to regenerate the fuel and oxidant gas during the recharging of the cell. It is therefore feasible, in principle, to operate the cells of my copending patent application, regeneratively, with added electrolyte, but this requires provision for storing and returning of the water. However, the fuel cells of the present invention are ideally suited for regenerative operation and possess the advantage of being more readily fabricated than the previous cells, from a wider variety of materials, including commercially available ion-exchange membranes, without necessity for providing for return of water since it is possible with my novel electrodes to prevent expulsion of the water from the electrodes during the discharge period.

An object of the present invention is to provide a combination electrode and electrolyte structure for a fuel cell which is operable in repetitive, regenerative cycles, each cycle comprising both a discharge and charge interval or period.

A further object of this invention is to provide a fuel cell having a high volume efficiency, high power capability, low polarization, high stability, and high efficiency throughout the regenerative cycle.

These and other objects of my invention are accomplished by providing a fuel cell comprising a matrix having an electrolyte sorbed therein, a pair of gas-permeable electrically conductive, hydrophobic electrodes comprising at least one gas adsorbing metal embedded in polytetrafluoroethylene and in essentially complete contact with the two major surface layers of the matrix, means for supplying a gaseous fuel to one of said electrodes, and means for providing a supply of oxidant gas to the other electrode.

My invention may be better understood by reference to the following description, taken in connection with the drawing, in which:

FIG. 1 is an exploded view of a fuel cell within the present invention; and

FIG. 2 is an enlarged cross-sectional view of the assembled fuel cell shown in FIG. 1 to show structural detail.

Although a number of different types of electrode structures are suitable for use in the cells of the present invention, each electrode should be one which: is an electronic conductor, will adsorb the fuel or oxidant employed, will act as a catalyst for the electrode reaction, and will not itself oxidize severely under the operating conditions of the cell. Suitable gas adsorbing metals are well known and many are described for example, in "Catalysts, Inorganic and Organic," Berkman, Morrel and Egloff, Reinhold Publishing Co., New York (1940); "Catalytic Chemistry," H. W. Lohse, Chemical Publishing Co., Inc., N.Y. (1945); etc. Suitable materials include the noble metals of Group VIII series of metals of the Periodic Table of Elements, which are rhodium ruthenium, palladium, osmium, iridium, and platinum. Other suitable metals include the other metals of Group VIII, e.g., nickel, iron, cobalt, etc., as well as other metals known to catalytically adsorb gases, e.g., silver, copper and metals of the transition series, e.g., manganese, vanadium, rhenium, etc. In addition to electrodes formed of these metals, the electrodes can be formed of platinum or palladium black which has been deposited on a base metal such as stainless steel, iron, nickel and the like. In addition, suitable electrodes may be formed from metal oxides and carbon which have been activated with platinum or palladium, or from carbon which has been activated with oxides of iron, magnesium, cobalt, copper, etc.

Since the adsorption of gases on solids is a surface phenomenon, it is desirable that the electrodes be of the maximum practicable surface area and that the surface preferably be in its most active state for the adsorption of gases. Also, for maximum cell efficiency each electrode should cover, as uniformly as possible, the entire effective major surface of the matrix. The effective area is that area which is in contact with the fuel gas. For these reasons, I prefer to use finely divided metal powders, having highly developed surface areas, for example, at least 10 square meters per gram and preferably at least 100 meters per gram. For maximum cell performance, I prefer to make the electrodes by using the very active metal powders of the Group VIII metals, for example, platinum black, palladium black, Raney nickel, etc. The noble metals of the Group VIII series of metals have a further advantage in that when the matrix is made from a cation exchange resin acidic corrosion conditions exist at both the anode and cathode which shorten the life of cells having electrodes made of materials such as nickel, iron, copper, etc. This effect does not occur in cells having electrodes made from the noble metals of Group VIII metals. The corrosive effect is not as pronounced in fuel cells using an anion exchange membrane because the conditions are now basic rather than acidic. Long cell life may be obtained by using any metals which are resistant to bases, for example, the Group VIII metals, including nickel, cobalt, etc., as well as the other known gas adsorbing metals, e.g., rhenium, in cells having an anion exchange resin membrane. Choice between these materials is governed by design considerations such as intended use, desired lifetime, gases used for fuel and oxidant, etc.

Many ways are available for constructing the catalytically active electrodes but essentially the finely divided metal powder is mixed with the polytetrafluoroethylene resin to obtain the most uniform dispersion as possible of the metal powder in the resin. The means which I have found yields the most uniform product is to take an aqueous emulsion of the polytetrafluoroethylene resin and mix it with from 2 to 20 grams of the metal powder per gram of polytetrafluoroethylene resin in the emulsion and form as thin a film as possible on a casting surface such as a sheet of metal foil, metal plate, etc., forming the final shape of the electrode, if desired, evaporating the water from the emulsion, followed by sintering of the polytetrafluoroethylene under pressure, if desired, at a temperature high enough to cause sintering of the individual particles of polytetrafluoroethylene into a coherent or unitary mass. Thereafter, the electrode is removed from the casting surface and is cut to the desired shape if not so formed by the casting operation. I have found that such a procedure is extremely desirable since it produces a gas-permeable, electronically conductive, hydrophobic electrode having very high mechanical strength without any further processing. Alternatively, the metal powder can be mixed with dry powdered polytetrafluoroethylene, shaped, pressed and sintered in either thin film or thick masses which can be shaped or cut to thin films to be used as the electrodes. However, such techniques offer no advantages and are more difficult and time consuming than the use of the emulsion. Since aqueous emulsions of polytetrafluoroethylene are readily available as commercial products, I prefer to use the emulsion technique in forming my electrodes. On the other hand, it is to be understood that in forming the electrode the resin and metal powder mix may be calendered, pressed, cast or otherwise formed into a sheet. Alternatively, a fibrous cloth or mat, preferably of fibers that are resistant to the highly acidic or basic conditions which they will encounter in the fuel cell, for example, glass, asbestos, acrylonitrile, vinylidene chloride, polytetrafluoroethylene, etc. fibers, may be impregnated and surface coated with the mixture of polytetrafluoroethylene and metal powder. Although other materials such as polytrifluorochloroethylene, polyethylene, polypropylene, polytrifluoroethylene, etc., could conceivably be substituted for the polytetrafluoroethylene, the chemical resistance of these materials is inferior to polytetrafluoroethylene under the conditions encountered in the fuel cells and therefore such substitution could only be made with considerable sacrifice in desired performance and stability of the electrodes.

Likewise, many ways are available for forming the solid matrix into which the aqueous electrolyte solution is to be sorbed. This matrix may be made from gelled, foamed, powdered or fibrous material and if fibrous may be either woven into cloth or be unwoven matting or felts. If the material from which the solid matrix is to be made does not have ion exchange properties, or is not readily equilibrated with aqueous solutions, the matrix must be formed in such a way as to leave interstices which permit sorption of the aqueous electrolyte solution by capillary forces. If a porous matrix is to be formed from a monomeric material by polymerization or by evaporation of a solution or molding of the solid polymer, then steps must be taken to incorporate either a foaming agent or an extractable material which will permit the formation of a matrix in which the electrolyte may be sorbed. If the matrix is formed from woven fabric or from the matting or felting of fibers, the methods used will normally inherently produce a porous material capable of sorbing the aqueous electrolyte solution, e.g., by wicking or capillary action. However, in this case, quite often the interstices will be of such dimensions that an effective gas barrier is not produced, since even small pressure differentials may expel the electrolyte from the pores. In this case a gas barrier of closely matted fibers such as is produced by felting or production of paper may be incorporated as at least one layer to produce a laminated matrix having sufficient gas barrier properties. The solid matrix does not need to be of uniform construction and can, for example, be made by the assembling of various layers of which only one has to have the gas-barrier properties described above. The only other requirements of the matrix are that it must be able to withstand any pressure differential within the cell, be able to sorb the aqueous electrolyte solution which is not electronically conductive, but is desirably ionically conductive, and must be inert to chemical attack by the electrolyte. Suitable materials are, by way of example, asbestos, vinylidene chloride, acrylonitrile, polytetrafluoroethylene, etc., which may all be used in fibrous woven, matted, felted or porous molded, cast, calendered, etc., structures, silica gels (for acid electrolytes), porous ceramics, ion exchange resin membranes, etc.

The cells produced with these matrices are operable at room temperature and atmospheric pressure. If desired, the cells may be operated above or below ambient atmospheric conditions of temperature and pressure within the limits of the freezing and boiling point of the aqueous electrolytes present within the matrix. To avoid rupture of the matrix, pressure of the fuel and oxidant gas in contact with the membrane should preferably be equal but in no case should the pressure difference exceed the ability of a matrix to withstand the force.

The ion exchange resin membranes are ideally suited for producing my solid matrices because by their very nature, they readily absorb the electrolyte solution and are highly chemically resistant thereto. Furthermore, they are amenable to various techniques of fabrication of suitable matrices and by their very nature are gas barriers preventing any intermixture of the fuel and oxidant gases. The electronic conduction of the membrane is negligible, electrolytic conductance of the membrane can be made high, the membranes resist the passage of uncharged gases, the membranes are self-supporting and can be reinforced to produce membranes having high mechanical strength and the membranes can be prepared of thin sheets of large area which are necessary for favorable cell geometry.

The ion exchange resin membranes may be formed by the same techniques used in making the solid matrix and in addition since by their very nature they will be capable of sorbing the aqueous electrolyte solution, they may be cast, calendered or shaped directly into sheet form from the resin without the necessity for providing interstices in the matrix structure. If the resin used was in the partially polymerized or cured state, it may be further polymerized or cured after forming into a sheet either to a further advanced state of polymerization or to a fully polymerized state. Well known pressing techniques using external shims, forms, molds, etc., can be used to limit the flow of the resin and if desired to produce membrane assemblies having a specific thickness and shape.

The ion exchange resins include in their polymeric structure ionizable radicals, one ionic component of which is fixed or retained by the polymeric matrix with at least one component being a mobile, replaceable ion electrostatically associated with the fixed component. The ability of the mobile ion to be replaced under appropriate conditions by other ions, imparts ion exchange characteristics to these materials.

As is well known, ion exchange resins can be prepared by polymerizing a mixture of ingredients, one of which contains an ionic substituent. In the case of cation exchange resins, these ionic groups are acidic groups such as the sulfonic acid group, the carboxyl group, and the like. In the case of anion exchange resins, the ionic group is basic in nature and may comprise amine groups, quaternary ammonium hydroxides, the guanidine group, the dicyandiamidine group, and other nitrogen-containing basic groups. In the case of these ion exchange resins, the ionizable group is attached to a polymeric compound such as a phenol-formaldehyde resin, a polystyrene-divinyl benzene copolymer, a urea-formaldehyde resin, a melamine-formaldehyde resin, a polyalkylene polyamine-formaldehyde resin, etc. Thus, a typical cation exchange resin may be prepared by polymerizing the reaction product of m-phenolsulfonic acid with formaldehyde. A typical anion exchange resin may be prepared by polymerizing the reaction product of phenonl, formaldehyde and triethylenetetramine. The preparation and properties of a number of different types of ion exchange resins are described throughout the literature and in particular in "Ion Exchange," Nachod, Academic Press, Inc., New York (1950); "Ion Exchange Resins," Kunin and Myers, John Wiley & Sons, Inc., New York (1950); "Styrene, Its Polymers and Copolymers and Derivatives," Boundy and Boyer, Reinhold, New York (1950); and in U.S. patents such as 2,366,007—D'Alelio; 2,366,008—D'Alelio; 2,663,702—Kropa; 2,664,397—Hutchinson; 2,678,306—Ferris; 2,658,042—Johnson; 2,681,319—Bodamer; 2,681,320—Bodamer.

The formation of these ion exchange resins into membrane or sheet form is also well known in the art. In general, these membranes are of two forms, the mosaic or heterogeneous type in which granules of ion exchange resin are incorporated into a sheet-like matrix of a suitable binder, for example, a binder of polyethylene or polyvinyl chloride, and the continuous or homogeneous ion exchange resin membrane in which the entire membrane structure has ion exchange characteristics. The latter type of membrane may be formed by molding or casting a partially polymerized ion exchange resin into sheet form. The formation of these ion exchange membranes is described, for example, in "Amberplex Ion Permeable Membranes," Rohm and Haas Co., Philadelphia (1952), and in the references mentioned in this publication. In addition, the preparation of a plurality of different types of ion exchange membranes is described in Patents 2,636,851 —Juda et al. and 2,702,272—Kasper.

As a general rule, ion exchange resins are formed in aqueous solutions or emulsions of various types of organic compounds so that when the membrane is formed it is substantially saturated with water. Thus, a phenol sulfonic acid-formaldehyde resin is found to contain a plurality of reactive sites consisting of $-SO_3H$ radicals attached to the resin matrix with sufficient water being held in the resin matrix by Van der Waals force so that the H+ ion is extremely mobile in the resin matrix. In this form the resin is described as being hydrated. The term "hydrated" means that the resin contains enough water to substantially saturate the resin but the resin is not necessarily wet. The amount of water in a hydrated ion exchange resin may vary within wide limits depending on the particular composition of the resin and its physical structure. Generally, the hydrated resins employed in the present invention contain from about 15 to 50 percent, by weight, of water held in the resin by secondary Van der Waals forces. This water of hydration cannot be removed from the resin by mechanical forces, but can be removed from the resinous material by subjecting the resin to a vacuum of several microns. It is also possible to replace the water of hydration with an aqueous electrolyte by immersing the membrane in a suitable aqueous solution of acid or base. Before assembly into a cell, the membrane can be blotted dry and no free flowing fluid need be present in the cell. The membrane may then be looked upon as providing a gel-like matrix for the additional unbound electrolyte. Membranes so treated have higher conductances than those in the thoroughly leached form. In addition, improved performance of the electrodes may result. Best results are obtained by using a strong acid with a cation exchange resin or a strong base with an anion exchange resin. Strong acids and strong bases are those having a high degree of ionization. The concentration of the electrolyte should be as high as can be tolerated without chemically affecting the chemical constitution of the membrane and adversely affecting its mechanical and electrical properties. Likewise, the chemical constitution of the electrolyte should be such that electrolysis of its solution produces hydrogen and oxygen and the electrolyte must be soluble in the aqueous phase, and should have a low enough vapor pressure that it does not volatilize into the gaseous phase.

Because of these limitations, the most desirable electrolytes to be used with cation exchange resin membranes are sulfuric acid, phosphoric acid, the aromatic sulfonic acids, such as benzene, mono-, di-, and trisulfonic acids, toluene, mono-, di- and trisulfonic acids, the naphthalene sulfonic acids, such as the alpha and beta-naphthalene, monosulfonic acids, and the various naphthalene disulfonic acids, etc. Fuel cells using aqueous phosphoric acid electrolytes are disclosed and claimed in the copending application of W. T. Grubb, Serial No. 271,356, filed April 8, 1963, and assigned to the same assignee as the present invention. In general, acids and bases having a dissociation constant of at least $1 \times 10^{-4}$ would be satisfactory, providing an aqueous solution of the electrolyte can be electrolyzed to produce hydrogen and oxygen, and are essentially non-volatile. Typical of the bases which may be used in conjunction with anion exchange resins are sodium hydroxide, potassium hydroxide, lithium hydroxide, cesium hydroxide, rubidium hydroxide, etc. Fuel cells using aqueous cesium and rubidium hydroxide, carbonate and bicarbonate electrolytes are disclosed and claimed in the copending application of E. J. Cairns, Serial No. 357,348, filed April 1, 1964 as a continuation-in-part of application Serial No. 232,688, filed October 24, 1962, now abandoned, both of which are assigned to the same assignee as the present invention. If the matrix is inert to both acids and bases, then the electrolyte may be either acidic or basic. In view of their ready availability, stability under fuel cell operating conditions, low cost, and high degree of ionization in aqueous solution, I prefer to use inorganic acids, e.g., sulfuric acid, phosphoric acid, etc., or inorganic bases, e.g., sodium hydroxide, potassium hydroxide, etc.

In assembling the fuel cell an electrode is placed on each of the two major surfaces of the solid matrix having sorbed therein the desired aqueous electrolyte solution. Since the electrode has a somewhat limited electrical conductivity which increases the internal resistance of the cell, it is desirable to back up the electrode with a current collecting terminal made of a good electrical conductor. This current collecting terminal can also be a structural member providing rigidity to the cell structure. These current collecting terminals may be suitably provided by the use of a screen, metal wires, metal bars, punched or expanded metal plates, etc., which do not prevent the fuel gas from contacting the electrode area, and are electrically connected to the appropriate electrical lead. In this application the current collecting terminal structure will be referred to as a terminal grid. These terminal grids may be either in contact with only the surface of the electrode or they may be incorporated into and form an integral part of the electrode. It will be readily apparent that when a terminal grid having an open structure is only in surface contact with the electrode that such a grid may have an electrode surface from a second membrane in contact with the opposite major surface of the terminal grid in a battery arrangement where more than one cell is connected together. In such an arrangement the two electrodes which are in contact with the same terminal grid will have the same electrical charge since they will be in contact with the same gas, i.e., either the fuel or oxidant gas. Such an arrangement joins the two cells in parallel.

One may also use a ribbed or corrugated, gas impermeable sheet as a terminal grid. This will allow gas on one side of the grid access to only one electrode surface. Such a terminal grid may be used as a separator or barrier in conjunction with two electrodes so that the fuel and oxidant gases, although separated, are in contact with the same grid but with different electrodes. In this scheme adjacent cells will be connected in series. An arrangement for such a battery assembly is more fully described in a copending application of Douglas and Cairns, Serial No. 850,588, filed November 3, 1959 now U.S. Patent 3,134,696 which is assigned to the same assignee as the present invention.

For a more complete understanding of the gaseous fuel cells and electrodes of the present invention, reference is made to the drawing, in which:

FIG. 1 is an exploded, schematic drawing of a fuel cell of the present invention; and FIG. 2 is an enlarged vertical cross-sectional view of the cell. This cell comprises a solid matrix 1 having sorbed therein an aqueous electrolyte solution having electrodes 2 and 3 and terminal grids 4 and 5. Leads 6 and 7 connected to terminal grids 4 and 5 respectively are used to deliver electrical current to the apparatus being operated by the cell during discharge operation and to conduct electrical current to the cell during the charge part of the cycle. Fuel gas, which is hydrogen in a regenerative type of fuel cell such as this, is supplied from a storage source (not shown) through inlet 8 to electrode 2 or is contained solely in chamber 9 formed by end plate 10, gasket 11 and electrode 2 on the surface of matrix 1. A valved outlet 12 is provided to exhaust any impurities which enter or accumulate in chamber 9. The oxidant gas, which is oxygen in a regenerative cell, is supplied from a storage source (not shown) through inlet 16 to electrode 3 or is contained solely in chamber 13 formed by end plate 14, gasket 15 and electrode 3 on the surface of matrix 1. Valved outlet 17 is provided for the withdrawal of impurities which enter or accumulate in chamber 13. In normal operation with hydrogen and oxygen, the valves on outlets 12 and 17 are closed. Because of the stoichiometry of the overall reaction, $H_2 + \frac{1}{2} O_2 = H_2O$, the volumes of the $H_2$ and $O_2$ storage chambers are in the ratio 2:1, so that pressure balance will be maintained during operation to eliminate any strain on the electrodes and matrix due to any pressure imbalance. Likewise, it may be desirable to incorporate a diaphragm or other pressure equalizing device between the storage chambers for the hydrogen and oxygen. The end plates, gaskets and matrix are held in gas-tight relationship with each other by means of a plurality of nuts 18, insulating washers 21, and bolts 19 which have insulating sleeves 20 which concentrically fit into the holes around the periphery of the end plates 10 and 14, and gaskets 11 and 15. Other alternative means of clamping these elements together are readily apparent to those skilled in the art. End plates 10 and 14 can be made of any material which has structural strength and can resist the corrosion conditions encountered by the cell. The end plates 10 and 14 may be made of metal but are preferably made from an insulating material, e.g., polystyrene, polymethyl methacrylate, vulcanized fiber, fibrous or fabric based phenolic, urea, or melamine laminates, hard rubber, etc. In such a case insulating sleeves 20 and insulating washers 21 may be omitted. Gaskets 11 and 15 may be made from any resilient rubbery type of polymer, but preferably one which is not affected by the feed gases or their reaction products with which is comes in contact. Suitable materials would be, for example, the synthetic rubbery elastomers such as silicone rubber, rubbery copolymers of fluorinated ethylene, synthetic rubbery copolymers of butadiene with styrene, acrylonitrile, isoprene, butene, chloroprene, or the homopolymers of chloroprene, etc. The insulating sleeves 20 and insulating washers 21 may be fabricated from any of the known insulators, such as those used for making the end plates 10 and 14.

FIG. 2 shows a vertical cross-sectional view of the cell of FIG. 1 in the plane of gas inlets 8 and 16 and outlets 12 and 17. In FIG. 2, matrix 1 has been fabricated without a fabric reinforcement. However, such reinforcement can be provided and is especially desirable if the solid matrix 1 has been fabricated from an ion exchange resin membrane. Such reinforcement can be any nonconductive material resistant to the chemical conditions existing in the membrane, for example, Orlon cloth, asbestos cloth, glass cloth, fibrous mats of Orlon, asbestos, glass, etc. It serves to strengthen the solid matrix 1 and can also serve a useful function during fabrication to define the thickness of the membrane. Terminal grids 4 and 5 illustrated as being made from metal wire screen, are shown as separate from electrodes 2 and 3 which are fabricated from metal powder incorpoated in polytetrafluoroethylene. In this structure the electrodes 2 and 3 and terminal grids 4 and 5 are held in close and as rigid as possible contact with the solid matrix by means of the compression of gaskets 11 and 15. Additional supports may be provided.

In the cells of FIGS. 1 and 2, where the electrolyte sorbed on matrix 1 is one having $H^+$ ions as the mobile ion, where the fuel gas is hydrogen and the oxidant gas is air or oxygen, the overall cell reaction is the oxidation of hydrogen to water. The respective discharge reactions at the anode 2 and cathode 3 are as follows:

(1) $\qquad H_2 = 2H^+ + 2e$
(2) $\qquad \frac{1}{2}O_2 + 2H^+ + 2e = H_2O$

Where hydrogen is used as a fuel gas it is noted that the product of the overall cell reaction is water. During charge, the above reactions are reversed.

It is not known whether this water forms at the electrodes or in the matrix. However, since the matrix is confined between the hydrophobic electrodes this water is retained within the matrix and merely dilutes the electrolyte with a slight increase in the volume of matrix 1. This increase in volume may be readily compensated for by several means, for example, further compression of gaskets 11 and 15, outward bowing of electrodes 2 and 3 and collecting grids 4 and 5, by use of wicking fingers, not shown, of matrix 1 extending through one or both electrode structures into the corresponding gas chambers 9 and 13 to permit electrolyte to expand into the gas chamber and yet be fed back to the matrix 1 when required, e.g., under power storage conditions. These fingers may be made of the same or different material from the matrix, but should have wicking or sponge-like properties and preferably have less affinity than the matrix for the electrolyte, so that the electrolyte is preferentially held in the matrix.

When the cell just described employs an electrolyte having $OH^-$ ion as the mobile ion sorbed in the matrix with hydrogen and oxygen, the overall discharge reaction is again the oxidation of hydrogen to water with the electrode reactions being:

(3) $\qquad H_2 + 2OH^- = 2H_2O + 2e$
(4) $\qquad \frac{1}{2}O_2 + H_2O + 2e = 2OH^-$ During charge, the above reactions are reversed.

The following examples are illustrative of the practice of my invention and are given by way of illustration only, and are not for purposes of limitation.

In general, the cells used in the following examples were constructed as schematically illustrated in FIGS. 1 and 2, with some minor variations. End plates 10 and 14 were constructed of sheets of polymethylmethacrylate and a second coarser terminal grid was used to back up terminal grids 4 and 5 completely filling the gas spaces 9 and 13. However, due to the coarseness of the screen, gas could freely flow and contact the entire surface area of electrodes 2 and 3. The examples illustrate the use of different matrices, different electrolytes, and different concentrations of metal particles in the electrode surface, as more fully explained in the specific examples.

The general method of preparing the electrodes was to slurry the desired weight of metal powder with an aqueous dispersion containing 60% by weight solid polytetrafluoroethylene, diluting with water if necessary, to obtain a consistency which could be spread easily over the desired area. Mixing was performed on a sheet of aluminum foil upon which had been scribed the outline of the desired electrode area. When a uniform slurry had been obtained, it was spread evenly over the desired area and the water evaporated by air drying. The aluminum sheet was then heated gently for a few minutes on a hot plate to drive off residual water. The dried film adhered well to the aluminum foil and presented no difficulties in either forming or handling. A second aluminum foil was placed over the dried film and the resulting sandwich placed in a hydraulic press where the electrodes were pressed at temperatures and pressures indicated in the specific examples. On removal from the press, the electrodes were quenched in water and the aluminum foil removed most conveniently by dissolving the aluminum in an aqueous 10-20% by weight solution of sodium hydroxide. The electrodes were self-supporting and could be easily handled without damage. They were rinsed and stored in distilled water until used.

The platinum catalyst used in Examples 1-6 had a measured surface area of the order of 10 square meters per gram and that of Example 7 although not measured was of the same general physical state of subdivision.

*Example 1*

To study the effect of pressure used in pressing the electrodes on their subsequent performance in a fuel cell, a series of electrodes were prepared using 17 milligrams of platinum black and 1.6 milligrams of polytetrafluoroethylene per square centimeter of electrode area. Four different pressures in the range of 0 to 6,900 lbs./square inch were applied for 2 minutes using a temperature of 350° C. These electrodes were assembled in the fuel cell as the oxygen electrode using a hydrogen electrode formed of the same concentration but pressed at the high pressure so that the only variation was in the oxygen electrode. The polarization characteristics of the cells were determined under both charge and discharge operation using a matrix which was an ion exchange resin having hydroxyl as the mobile ion. It had been equilibrated in a 5.4 molar aqueous solution of potassium hydroxide. In order to permit easy comparison between the various cells, the polarization data for each cell were plotted on rectangular coordinates and cell potentials at rounded values of the current were read from the smooth curves through the data points. These data are summarized in Table I.

TABLE I

| Current Density, ma./cm.² | Oxygen Electrodes Formed at the Indicated Pressure | | | |
|---|---|---|---|---|
| | 0* lbs./in.² | 110 lbs./in.² | 1,100 lbs./in.² | 6,900 lbs./in.² |
| | Cell Voltage on Discharge | | | |
| 5 | 0.96 | 0.96 | 0.97 | 0.94 |
| 10 | 0.93 | 0.93 | 0.92 | 0.92 |
| 20 | 0.87 | 0.89 | 0.88 | 0.87 |
| 40 | 0.82 | 0.83 | 0.81 | 0.82 |
| 60 | 0.78 | 0.78 | 0.76 | 0.76 |
| | Cell Voltage on Charge | | | |
| 5 | 1.57 | 1.55 | 1.54 | 1.60 |
| 10 | 1.61 | 1.58 | 1.59 | 1.64 |
| 20 | 1.69 | 1.63 | 1.64 | 1.71 |
| 40 | 1.80 | 1.71 | 1.74 | 1.81 |
| 60 | 1.89 | 1.79 | 1.83 | 1.89 |

*Hydrogen electrode was formed at 1,100 lbs./in.²

From the results of Table I, it is apparent that the pressure used in forming the electrodes had no influence on the electrode performance.

*Example 2*

To determine the effect of temperature and time used during the forming of electrodes, a series of electrodes were prepared using 17 milligrams of platinum black and 1.6 milligrams of polytetrafluoroethylene per square centimeter of electrode area. In pressing of the electrodes, a pressure of 1100 lbs./square inch was applied for times of 2 and 10 minutes, respectively, using a range of temperatures from 330 to 390° C.

Performance of these electrodes was compared as described under Example 1, with the results being summarized in Table II.

TABLE II

| Current Density, ma./cm.² | Oxygen Electrodes Formed at the Indicated Temperature and Time | | | | | |
|---|---|---|---|---|---|---|
| | 330° C., 2 min. | 350° C. | | 370° C. | | 390° C., 2 min. |
| | | 2 min. | 10 min. | 2 min. | 10 min. | |
| Cell Voltage on Discharge | | | | | | |
| 5 | 0.95 | 0.97 | 0.93 | 0.93 | 0.93 | 0.93 |
| 10 | 0.92 | 0.92 | 0.90 | 0.90 | 0.90 | 0.90 |
| 20 | 0.88 | 0.88 | 0.87 | 0.87 | 0.86 | 0.86 |
| 40 | 0.82 | 0.81 | 0.81 | 0.80 | 0.79 | 0.80 |
| 60 | 0.77 | 0.76 | 0.75 | 0.74 | 0.74 | 0.74 |
| Cell Voltage on Charge | | | | | | |
| 5 | 1.54 | 1.54 | 1.54 | 1.55 | 1.56 | 1.53 |
| 10 | 1.56 | 1.59 | 1.58 | 1.58 | 1.61 | 1.56 |
| 20 | 1.61 | 1.64 | 1.62 | 1.64 | 1.65 | 1.61 |
| 40 | 1.69 | 1.74 | 1.70 | 1.74 | 1.74 | 1.68 |
| 60 | 1.77 | 1.83 | 1.78 | 1.83 | 1.82 | 1.75 |

The data indicate that the temperature and time of the forming operation can be varied appreciably without any effect on the cell performance. However, it was noticed that the electrodes pressed at a temperature of 330° C. were mechanically weak, as compared to the others, and therefore a temperature of 330° C. apparently represents the minimum temperature which should be used in pressing and fusing the electrodes. Forming temperatures therefore are preferably between the range of 350° to 390° C., and molding times of 2 minutes are adequate.

*Example 3*

To determine the effect of the ratio of catalyst to polytetrafluoroethylene, a series of electrodes was prepared using 26 milligrams of platinum black per square centimeter of electrode area, with varying amounts of polytetrafluoroethylene. The electrodes were pressed for 2 minutes at 350° C. using a pressure of 1100 lbs./square inch.

The performance of these electrodes was compared as described under Example 1, with the test results summarized in Table III in terms of current density versus voltage relationship.

TABLE III

| Current Density, ma./cm.² | Weight Ratio of Platinum to Polytetrafluoroethylene | | | |
|---|---|---|---|---|
| | 26:1.2 | 26:2.4 | 26:5.9 | 26:12 |
| Cell Voltage on Discharge | | | | |
| 5 | 0.97 | 0.97 | 0.93 | 0.90 |
| 10 | 0.93 | 0.93 | 0.87 | 00.85 |
| 20 | 0.90 | 0.89 | 0.80 | 0.76 |
| 40 | 0.83 | 0.81 | 0.70 | 0.61 |
| 60 | 0.78 | 0.76 | 0.62 | |
| Cell Voltage on Charge | | | | |
| 5 | 1.53 | 1.56 | 1.58 | 1 62 |
| 10 | 1.58 | 1.59 | 1.63 | 1.72 |
| 20 | 1.63 | 1.65 | 1.72 | 1.87 |
| 40 | 1.71 | 1.74 | 1.89 | |
| 60 | 1.78 | 1.82 | | |

The data demonstrate clearly that with the 26 milligrams of platinum per square centimeter of electrode area, there is a distinct advantage in maintaining a high ratio of platinum to polytetrafluoroethylene and preferably at least a ratio of about 2 parts by weight of platinum per part of polytetrafluoroethylene. There is a mechanical limitation on the maximum ratio of platinum to polytetrafluoroethylene in that electrodes having about 50 parts by weight of platinum per part of polytetrafluoroethylene become so weak mechanically as to be of no value in this application. The ratio in the range of 10 to 25 parts by weight of platinum per part of polytetrafluoroethylene appears to offer the optimum ratio especially when preparing electrodes in the form of thin films.

*Example 4*

To determine the effect of the amount of platinum used for a given size electrode on the performance of the fuel cell, a series of electrodes was prepared using various amounts of material, all with a ratio of 1 milligram of platinum per 0.09 milligram of polytetrafluoroethylene. This gave electrodes of different thicknesses but the same platinum concentration per unit of volume. The electrodes were molded for 2 minutes at 350° C. under a pressure of 1100 lbs./square inch. The performance of these electrodes in a fuel cell was compared as described under Example 1, with the results being summarized in Table IV, in terms of current density versus voltage.

TABLE IV

| Current Density, ma./cm.² | Concentrations of Platinum per Square Centimeter of Electrode Area | | | |
|---|---|---|---|---|
| | 4.4 mg./cm.² | 8.8 mg./cm.² | 18 mg./cm.² | 26 mg./cm.² |
| Cell Voltage on Discharge | | | | |
| 5 | 0.90 | 0.94 | 0.97 | 0.97 |
| 10 | 0.88 | 0.91 | 0.92 | 0.93 |
| 20 | 0.84 | 0.87 | 0.88 | 0.89 |
| 40 | 0.78 | 0.81 | 0.81 | 0.81 |
| 60 | 0.73 | 0.77 | 0.76 | 0.76 |
| Cell Voltage on Charge | | | | |
| 5 | 1.56 | 1.55 | 1.54 | 1.56 |
| 10 | 1.60 | 1.58 | 1.59 | 1.59 |
| 20 | 1.65 | 1.63 | 1.64 | 1.65 |
| 40 | 1.75 | 1.72 | 1.74 | 1.74 |
| 60 | 1.86 | 1.80 | 1.83 | 1.82 |

The data indicate that there is little effect in the amount of catalyst per square centimeter of electrode area over the range indicated. However, the performance is declining with the smallest amount used as is also the structural strength, due to the film being very thin compared to the others. Both from a performance and practical economics point of view, there is no reason, other than for mechanical strength, to want to prepare electrodes having a thick cross-section, since the only other effect would be to increase the length of the diffusion path for the fuel and oxidant gases.

*Example 5*

To demonstrate the use of various matrices, cells were assembled in which the electrolyte was 5.4 molar aqueous potassium hydroxide sorbed in polyethylene terephthalate polyester fiber cloth, 5.4 molar aqueous potassium hydroxide sorbed in asbestos cloth and a cation exchange resin in which a hydrogen ion was the mobile ion which had been equilibrated with a 2 normal aqueous sulfuric acid solution. In each of the cells, the electrodes used contained 17 milligrams of platinum black and 1.6 milligrams of polytetrafluoroethylene per square centimeter of electrode area. The electrodes were made by molding for 2 minutes at 350° C. at a pressure of 6,900 lbs./square inch. In the case of the asbestos cloth matrix the electrodes were bonded directly to the two major surfaces of the asbestos during the fabrication of the electrodes.

The performance of these cells was compared as in Example 1 with the results summarized in Table V.

The constancy of performance of these cells is shown by the data in Table VI where the voltages shown are

TABLE VI.—PERFORMANCE ON CONTINUOUS CYCLE

| Cell A With Asbestos Cloth Matrix | | | Cell B With Anion Matrix | | | Cell C With Cation Matrix | | |
|---|---|---|---|---|---|---|---|---|
| Days on Voltage at end of— | | | Days on Voltage at end of— | | | Days on Voltage at end of— | | |
| Cycle | Charge | Discharge | Cycle | Charge | Discharge | Cycle | Charge | Discharge |
| 0 | 1.72 | 0.80 | 0 | 1.63 | 0.85 | 0 | 1.72 | 0.80 |
| 1 | 1.74 | 0.74 | 1 | 1.72 | 0.83 | 1 | 1.74 | 0.77 |
| 2 | 1.77 | 0.72 | 2 | 1.74 | 0.82 | 2 | 1.73 | 0.75 |
| 4 | 1.79 | 0.79 | 4 | 1.77 | 0.80 | 3 | 1.74 | 0.76 |
| 8 | 1.91 | 0.76 | 9 | 1.79 | 0.78 | 8 | 1.74 | 0.75 |
| 15 | 1.89 | 0.80 | 13 | 1.80 | 0.77 | 10 | 1.74 | 0.74 |
| 21 | 1.92 | 0.80 | 17 | 1.81 | 0.77 | 12 | 1.74 | 0.74 |
| 28 | 1.91 | 0.78 | 24 | 1.80 | 0.78 | 16 | 1.75 | 0.74 |
| 39 | 1.91 | 0.78 | 29 | 1.82 | 0.79 | 23 | 1.75 | 0.74 |
|  |  |  | 35 | 1.80 | 0.75 | 28 | 1.76 | 0.74 |
|  |  |  |  |  |  | 34 | 1.78 | 0.71 |

TABLE V

| Current Density, ma./cm.² | Dynel Matrix | Asbestos Matrix | Cation Exchange Matrix |
|---|---|---|---|
| Cell Voltage on Discharge | | | |
| 5 | 0.91 | 0.94 | 0.93 |
| 10 | 0.87 | 0.89 | 0.90 |
| 20 | 0.81 | 0.84 | 0.85 |
| 40 | 0.73 | 0.76 | 0.79 |
| 60 | 0.67 | 0.70 | 0.73 |
| Cell Voltage on Charge | | | |
| 5 | 1.56 | 1.56 | 1.63 |
| 10 | 1.60 | 1.60 | 1.69 |
| 20 | 1.67 | 1.66 | 1.77 |
| 40 | 1.79 | 1.76 | 1.87 |
| 60 |  | 1.83 | 1.95 |

*Example 6*

In order to study the performance of electrodes and electrolyte during extended cycling of charge and discharge without computation of factors which might be introduced in a completely closed system, three cells were made up, with different matrices; in Cell A, the matrix was asbestos cloth, in Cell B the matrix was an anion exchange resin, and in Cell C the matrix was a cation exchange resin. The first two matrices were equilibrated with 5.4 molar aqueous potassium hydroxide solution and the third matrix was equilibrated with 2 N sulfuric acid. In all three cells, the electrodes contained 17 milligrams of platinum and 1.6 milligrams of polytetrafluoroethylene per square centimeter of electrode area using molding conditions within the range shown in Examples 1 and 2. The fuel cells were run on a 6-hour cycle of 4.78 hours on charge, and 1.22 hours on discharge. During discharge, the cells were run from supply tanks of oxygen and hydrogen through pressure regulators and the vent tubes from the cells were water sealed by having the exit tubes 12 and 17 immersed below the surface of water. During discharge operation, the supply of gases was regulated so that no gas escaped from the vents. During the charge part of the cycle, the pressure in the cell built up to a few inches of water and the gases generated in the cell were expelled from the system through the vent lines, where it conveniently could have been collected and reused on the next discharge cycle.

Current densities for charge and discharge operation were adjusted to maintain a coulombic balance across the cycles, i.e., 13 milliamperes per square centimeter during the discharge part of the cycle, and 3.3 milliamperes per square centimeter during the charge part of the cycle.

those at the end of the charge and discharge portion of the cycles for the extended periods indicated.

*Example 7*

Fuel cells having an alkaline electrolyte sorbed on an anion exchange resin membrane between 4 inch diameter electrodes have been operated for extended periods of time on repetitive, regenerative cycle. These cells were hermetically sealed so that they could be operated on a completely closed cycle. The cell housings were fabricated from circular stainless steel plates which had gas storage chambers machined into their faces. Ribs left in the storage volumes served as supports for the electrodes and screen type terminal grids. The design was such that the hydrogen storage chamber had twice the volume of the oxygen storage chamber. Sealing was accomplished by offset O-rings bearing against either side of the membrane at the outer edges. A third O-ring was required around the periphery of the ion-exchange membrane in order to prevent evaporation of water to the atmosphere.

Differential pressures are produced during operation when the hydrogen and oxygen gas storage compartments are not in an exact 2 to 1 volume ratio, placing a strain on the electrodes and matrix separating the two chambers. Normal manufacturing tolerances make it difficult to control this ratio precisely. Pressure balance was maintained by connecting the cell chambers to a compensating device which consisted of a flexible rubber diaphragm between the hydrogen and oxygen ballast chambers. Flexing of the diaphragm then adjusted the volumes to maintain the pressure balance.

The electrodes used in the cell of this example were fabricated by the procedures already described for the smaller electrodes. In this case, they contained 23 milligrams of platinum black and 3.1 milligrams polytetrafluoroethylene per square centimeter of electrode. The cure temperature was 357° C. for 2.5 minutes at a pressure of 2000 lbs./square inch. The electrolyte was an anion exchange membrane that had been equilibrated with 30% potassium hydroxide.

The duty cycle is indicated by the data in Table VII. Operation was performed with the cell sealed against the atmosphere. During the first 413 cycles the cell was charged for a period of 55 minutes during which time the gas pressure in both the hydrogen and oxygen chambers of the cell built up to about 50 p.s.i.g. The cell was then placed on discharge for a period of 40 minutes before again going on the charge part of the cycle. During this period, it was completely discharged.

After operation for 413 cycles the mode of operation was changed somewhat. A pressure operated switch was connected to the cell, and the charging current was increased as was the operating pressure. The pressure switch was set so that the charging current would be interrupted when the gas pressure in the chambers reached 100 p.s.i.g. This occurred in less than the 55 minutes available for charging, and the cell then remained on open circuit until it was switched to a load after the full 55 minutes period had elapsed. The period allowed for discharge was 35 minutes. Performance data are summarized in Table VII.

TABLE VII

| Cycle No. (90 min. ea.) | ma./cm.$^2$ | Charge | | | ma./cm.$^2$ | Discharge | | |
|---|---|---|---|---|---|---|---|---|
| | | Amps. totl. | Volts avg. | Watt-Min. | | Amps. totl. | Volts avg. | Watt-Min. |
| 44 | 10.9 | 0.88 | 1.72 | 83 | 16.3 | 1.32 | 0.65 | 27 |
| 100 | 10.9 | 0.88 | 1.65 | 80 | 16.0 | 1.30 | 0.69 | 27 |
| 195 | 10.9 | 0.88 | 1.77 | 86 | 14.9 | 1.21 | 0.64 | 27 |
| 303 | 10.9 | 0.88 | 1.65 | 80 | 14.8 | 1.20 | 0.62 | 29 |
| 413 | 10.9 | 0.86 | 1.70 | 82 | 15.5 | 1.26 | 0.70 | 34 |
| 502 | 13.6 | 1.10 | 1.70 | 84 | 15.8 | 1.28 | 0.64 | 29 |
| 612 | 13.6 | 1.10 | 1.72 | 89 | 15.8 | 1.28 | 0.65 | 29 |
| 725 | 13.6 | 1.10 | 1.73 | 91 | 16.0 | 1.30 | 0.66 | 30 |
| 838 | 13.6 | 1.10 | 1.71 | 83 | 14.8 | 1.20 | 0.61 | 25.6 |
| 886 | 13.6 | 1.10 | 1.80 | 89 | 15.3 | 1.24 | 0.64 | 28 |
| 950 | 13.6 | 1.10 | 1.72 | 85 | 15.4 | 1.25 | 0.64 | 28 |
| 993 | 13.6 | 1.10 | 1.75 | 86 | 15.3 | 1.24 | 0.64 | 28 |

*Example 8*

Fuel cells can be made and tested as described in Example 7, in which palladium black is used in place of the platinum black. Such cells when operated under repetitive regenerative cycles as described in Example 7 yield similar operating data showing that the substitution of the palladium for the platinum has no significant effect on the operation of the fuel cell.

In making the matrix for the examples from the polyester fiber cloth, six thicknesses were employed to obtain a suitable capacity for the volume of electrolyte to be used. In addition, one layer of filter paper was placed in the center of the stack to provide a reliable gas barrier. In the case of asbestos cloth, one layer was employed which was approximately 80 mils in thickness, and the electrodes were firmly bonded to the surface of the asbestos cloth by substituting the asbestos cloth for one sheet of the aluminum foil in pressing and forming each of the two electrode areas.

In the foregoing examples, it is to be noted that the current is expressed in terms of current per unit area of electrode, i.e., milliamperes per square centimeter of electrode area, and not in terms of the full current for the full area of the experimental cell. By such conversion to a unit area, comparison of the performance of different size cells is facilitated.

The procedures given in the above examples are not limited to platinum catalyst, but other metal catalysts, for example, the catalytically active metals previously described, specific examples of which are silver, palladium, activated carbons coated with such metals, etc., may also be used.

It is of importance to remember that the volume ratios of the catalyst-to-binder are more significant than the weight ratios. The appropriate weight ratios of a catalyst-to-binder can therefore be estimated from the data in the examples by using the density ratios to calculate the weights of the materials required to maintain the same volume ratios as for the platinum and polytetrafluoroethylene. As explained and demonstrated in Example 3, the ratio on a weight basis of platinum to polytetrafluoroethylene should be in the range of 2 to 25 parts by weight platinum per part of polytetrafluoroethylene. Since the density of platinum is 21.45 g./cc., and the density of polytetrafluoroethylene is 2.13 g./cc., the above range of 2 to 25 parts by weight of platinum per part polytetrafluoroethylene converted to a volume basis becomes 0.2 to 2.5 parts by volume of platinum per volume of polytetrafluoroethylene. This volume ratio is applicable to all of the gas absorbing metals, since the volume ratio is independent of the different in densities of the various metals. It is apparent that the volumes used in determining these ratios are not the apparent volumes based on bulk densities which are dependent not only upon the true density of the material, but also on the degree of subdivision and degree of packing, but are the actual volumes for the mass of metal and polytetrafluoroethylene based on the true density which is independent of the degree of subdivision and degree of packing.

Other modifications of this invention and variations in the structure may be employed without departing from the scope of the invention; for example, the shape of the cell may be varied and may be conveniently chosen to fit into an existing space. Two or more of these cells may be joined together to produce batteries.

The fuel cells of this invention may be used for any application where a reliable source of direct current electric power is required to activate motors, instruments, radio transmitters, lights, heaters, etc. The power from the fuel cell could also be used to drive a thermoelectric refrigerator, which requires a low voltage source of direct current. Although the fuel cells of this invention are ideally suited for operation on a regenerative cycle, it will be obvious that these cells could be used, if desired, as a primary source of power on a non-regenerative cycle.

These and other modifications of this invention which will readily be discernible to those skilled in the art may be employed within the scope of the invention. The invention is intended to include all such modifications and variations as may be embraced within the following claims.

What I claim as new and desire to secure by Letters Patent of the United States is:

1. A gaseous fuel cell comprising an aqueous electrolyte solution sorbed in a solid matrix which is positioned between and in direct electrical contact with a pair of gas permeable, hydrophobic, electronically conductive electrode elements, each of said electrode elements comprising gas adsorbing metal particles bonded together into a unitary mass with polytetrafluoroethylene in the ratio on a volume basis of from 0.2 to 2.5 parts of the metal particles per part of polytetrafluoroethylene, means for supplying a fuel gas to one of said electrode elements and means for supplying an oxidant gas to the other of said electrode elements.

2. Fuel cells of claim 1 wherein the metal particles are deposited on electrically conductive carbon particles.

3. Fuel cells of claim 1 wherein the gas adsorbing metal particles are particles of at least one metal from the Group VIII series of metals.

4. Fuel cells of claim 1 wherein the gas adsorbing metal particles are particles of at least one of the noble metals of the Group VIII series of metals.

5. Fuel cells of claim 1 wherein the gas adsorbing metal particles are particles of platinum.

6. Fuel cells of claim 1 wherein the gas adsorbing metal particles are particles of platinum having a surface area of at least 10 square meters per gram.

7. Fuel cells of claim 1 wherein the gas adsorbing metal particles are particles of palladium.

8. Fuel cells of claim 1 wherein the gas adsorbing metal particles are particles of palladium having a surface area of at least 10 square meters per gram.

9. Fuel cells of claim 1 wherein the electrolyte is an aqueous solution of sulfuric acid.

10. Fuel cells of claim 1 wherein the electrolyte is an aqueous solution of an alkali metal hydroxide.

11. Fuel cells of claim 1 wherein the matrix is an ion exchange resin membrane.

12. Fuels cells of claim 11 wherein hydrogen ion is a mobile ion in the ion exchange membrane and the sorbed electrolyte is an aqueous solution of sulfuric acid.

13. Fuel cells of claim 11 wherein the mobile ion in the ion exchange membrane is a hydroxyl ion and the sorbed electrolyte is an aqueous solution of an alkali metal hydroxide.

14. Fuel cells of claim 1 wherein hydrogen is the fuel gas.

15. Fuel cells of claim 1 wherein oxygen is the oxidant gas.

16. In a fuel cell comprising a fuel gas chamber separated from an oxidant gas chamber by an aqueous electrolyte sorbed in a solid matrix and an electrode in contact with the fuel gas and matrix and another electrode in contact with the oxidant gas and matrix, the improvement which comprises a gas permeable, hydrophobic electrode structure comprising gas adsorbing metal particles bonded together with polytetrafluoroethylene in the ratio on a volume basis of from 0.2 to 2.5 parts of the metal particles per part of polytetrafluoroethylene.

17. The improvement of claim 16 wherein the gas adsorbing metal is at least one of the metals of the Group VIII series of metals.

18. The improvement of claim 16 wherein the gas adsorbing metal is at least one of the noble metals of the Group VIII series of metals.

19. The improvement of claim 16 wherein the gas adsorbing metal is platinum.

20. The improvement of claim 16 wherein the gas adsorbing metal is palladium.

21. An electrode structure comprising gas adsorbing metal particles bonded together with polytetrafluoroethylene in the ratio on a volume basis of from 0.2 to 2.5 parts of the metal particles per part of polytetrafluoroethylene, said electrode structure being gas permeable electronically conductive, and hydrophobic.

22. The electrode structure of claim 21 wherein the gas adsorbing metal is at least one of the metals of the Group VIII series of metals.

References Cited by the Examiner

UNITED STATES PATENTS

| | | | |
|---|---|---|---|
| 2,384,463 | 9/1945 | Gunn et al. | 136—86 |
| 2,641,623 | 6/1953 | Winckler | 136—121.1 |
| 2,662,065 | 12/1953 | Berry. | |
| 2,738,375 | 3/1956 | Schlotter | 136—30 |
| 2,824,165 | 2/1958 | Morsal | 136—86 |
| 2,913,511 | 11/1959 | Grubb | 136—86 |
| 3,113,048 | 12/1963 | Thompson | 136—86 |

FOREIGN PATENTS 806,591  12/1958  Great Britain.

OTHER REFERENCES

Norton: Journal of Applied Physics, vol. 28, No. 1, January 1957, pages 37–39.

WINSTON A. DOUGLAS, *Primary Examiner.*

JOHN R. SPECK, JOHN H. MACK, *Examiners.*

H. FEELEY, *Assistant Examiner.*